(12) United States Patent
Zeliger et al.

(10) Patent No.: US 9,201,897 B1
(45) Date of Patent: Dec. 1, 2015

(54) GLOBAL DATA STORAGE COMBINING MULTIPLE BACK-END STORAGE DEVICES

(71) Applicant: The MathWorks, Inc., Natick, MA (US)

(72) Inventors: Ohad Zeliger, Westborough, MA (US); Kevin M. Fisher, Ashland, MA (US); Prita V. Vaidya, Ashland, MA (US)

(73) Assignee: The MathWorks, Inc., Natick, MA (US)

( * ) Notice: Subject to any disclaimer, the term of this patent is extended or adjusted under 35 U.S.C. 154(b) by 223 days.

(21) Appl. No.: 13/828,532

(22) Filed: Mar. 14, 2013

(51) Int. Cl.
*G06F 17/30* (2006.01)

(52) U.S. Cl.
CPC ................................ *G06F 17/3023* (2013.01)

(58) Field of Classification Search
USPC .................................................. 707/694, 827
See application file for complete search history.

(56) References Cited

U.S. PATENT DOCUMENTS

| | | | |
|---|---|---|---|
| 7,003,642 B2 * | 2/2006 | Dawkins et al. ............... 711/164 |
| 7,072,934 B2 * | 7/2006 | Helgeson et al. ............. 709/203 |
| 7,752,606 B2 * | 7/2010 | Savage ........................... 717/135 |
| 7,941,299 B1 * | 5/2011 | Aldrich et al. ..................... 703/1 |
| 7,970,856 B2 * | 6/2011 | Goodman et al. ............. 709/217 |
| 7,974,714 B2 * | 7/2011 | Hoffberg ......................... 700/94 |
| 7,979,478 B2 * | 7/2011 | Hiraiwa et al. ................ 707/821 |
| 8,024,442 B1 * | 9/2011 | Roussos et al. ............... 709/223 |
| 8,332,609 B2 * | 12/2012 | Boutboul et al. .............. 711/170 |
| 8,666,709 B1 * | 3/2014 | Aldrich et al. ..................... 703/2 |
| 8,788,628 B1 * | 7/2014 | Taylor et al. ................... 709/219 |
| 8,849,759 B2 * | 9/2014 | Bestler et al. .................. 707/638 |
| 2003/0126522 A1 * | 7/2003 | English et al. ................ 714/718 |
| 2007/0078826 A1 * | 4/2007 | Bozkaya et al. ................... 707/3 |
| 2008/0201772 A1 * | 8/2008 | Mondaeev et al. .............. 726/13 |
| 2008/0208822 A1 * | 8/2008 | Bozkaya et al. ................... 707/3 |
| 2009/0055429 A1 * | 2/2009 | Notarnicola et al. .......... 707/102 |
| 2009/0106255 A1 * | 4/2009 | Lacapra et al. ................. 707/10 |
| 2011/0314071 A1 * | 12/2011 | Johnson et al. ............... 707/827 |
| 2013/0117240 A1 * | 5/2013 | Taylor et al. ................... 707/690 |
| 2013/0159123 A1 * | 6/2013 | Hochberg et al. ............ 705/26.1 |
| 2013/0159519 A1 * | 6/2013 | Hochberg et al. ............. 709/225 |
| 2013/0159655 A1 * | 6/2013 | Lee ................................ 711/164 |
| 2013/0332685 A1 * | 12/2013 | Kripalani et al. ............. 711/162 |
| 2013/0339407 A1 * | 12/2013 | Sharpe et al. ................. 707/827 |
| 2014/0025796 A1 * | 1/2014 | Vibhor et al. ................. 709/222 |
| 2014/0075371 A1 * | 3/2014 | Carmi ........................... 715/781 |
| 2014/0173229 A1 * | 6/2014 | Reohr et al. ................... 711/162 |
| 2014/0181085 A1 * | 6/2014 | Gokhale et al. ............... 707/722 |

* cited by examiner

*Primary Examiner* — Hanh Thai
(74) *Attorney, Agent, or Firm* — Harrity & Harrity, LLP

(57) ABSTRACT

A device establishes access to a first set of storage devices associated with a first storage characteristic and a second set of storage devices associated with a second storage characteristic. The first storage characteristic and the second storage characteristic include at least one of a consistency characteristic or a latency characteristic. The device receives a first request to store content, and determines a storage rule associated with the content, based on the first storage characteristic and the second storage characteristic. The storage rule specifies a manner in which the content is to be stored. The device transmits first information, associated with the content, to a first storage device of the first set of storage devices, based on the storage rule. The device transmits second information, including the content, to a second storage device of the second set of storage devices, based on the storage rule.

20 Claims, 10 Drawing Sheets

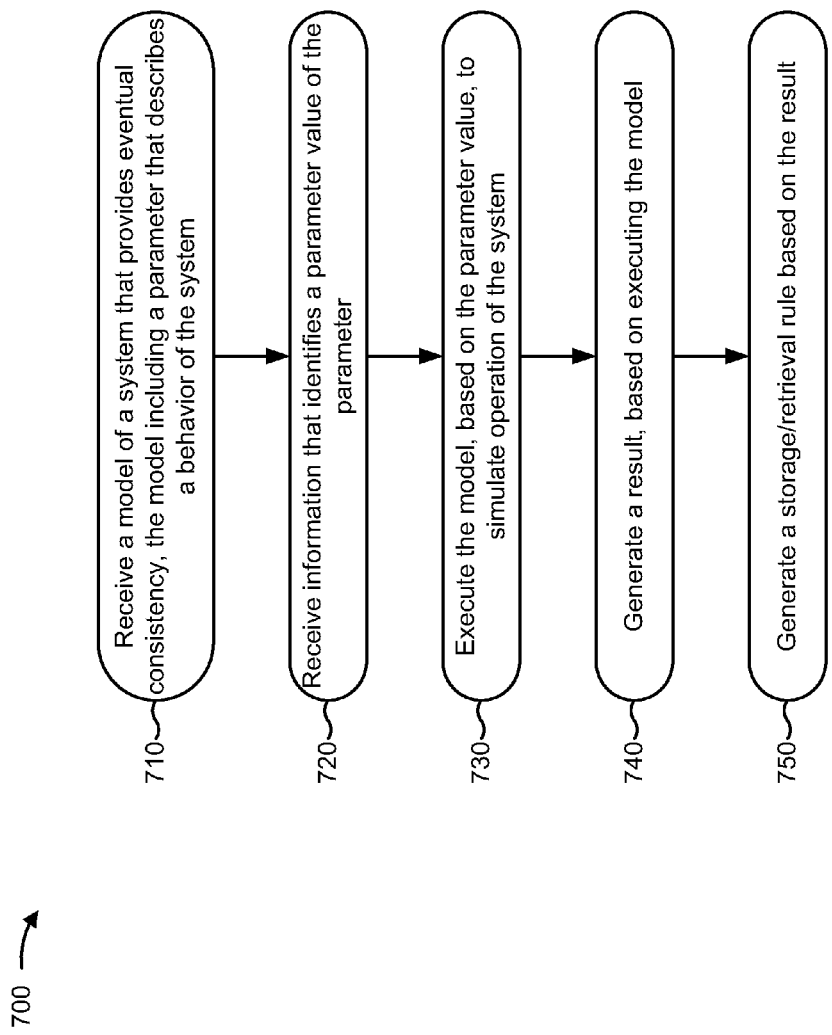

ent version), a user and/or client device 210 associated with the

GLOBAL DATA STORAGE COMBINING MULTIPLE BACK-END STORAGE DEVICES

BRIEF DESCRIPTION OF THE DRAWINGS

FIG. 7 is a flow chart of an example process for testing a storage system that provides eventual consistency.

DETAILED DESCRIPTION

The following detailed description of example implementations refers to the accompanying drawings. The same reference numbers in different drawings may identify the same or similar elements.

Businesses and people that store information in the cloud (e.g., to a remote server) often expect a cloud storage service to meet particular requirements, such as reliability, consistency, availability, speed, scalability, cost, etc. A single storage service may be designed to meet some of these requirements, but may not be able to guarantee performance across a variety of requirements. Storage solutions that combine multiple back-end storage services tend to expose the flawed features of each storage service. Implementations described herein combine multiple storage services in a manner that provides the benefits of each storage service, which allows user requirements, such as latency or consistency requirements, to be satisfied.

Figure 1:
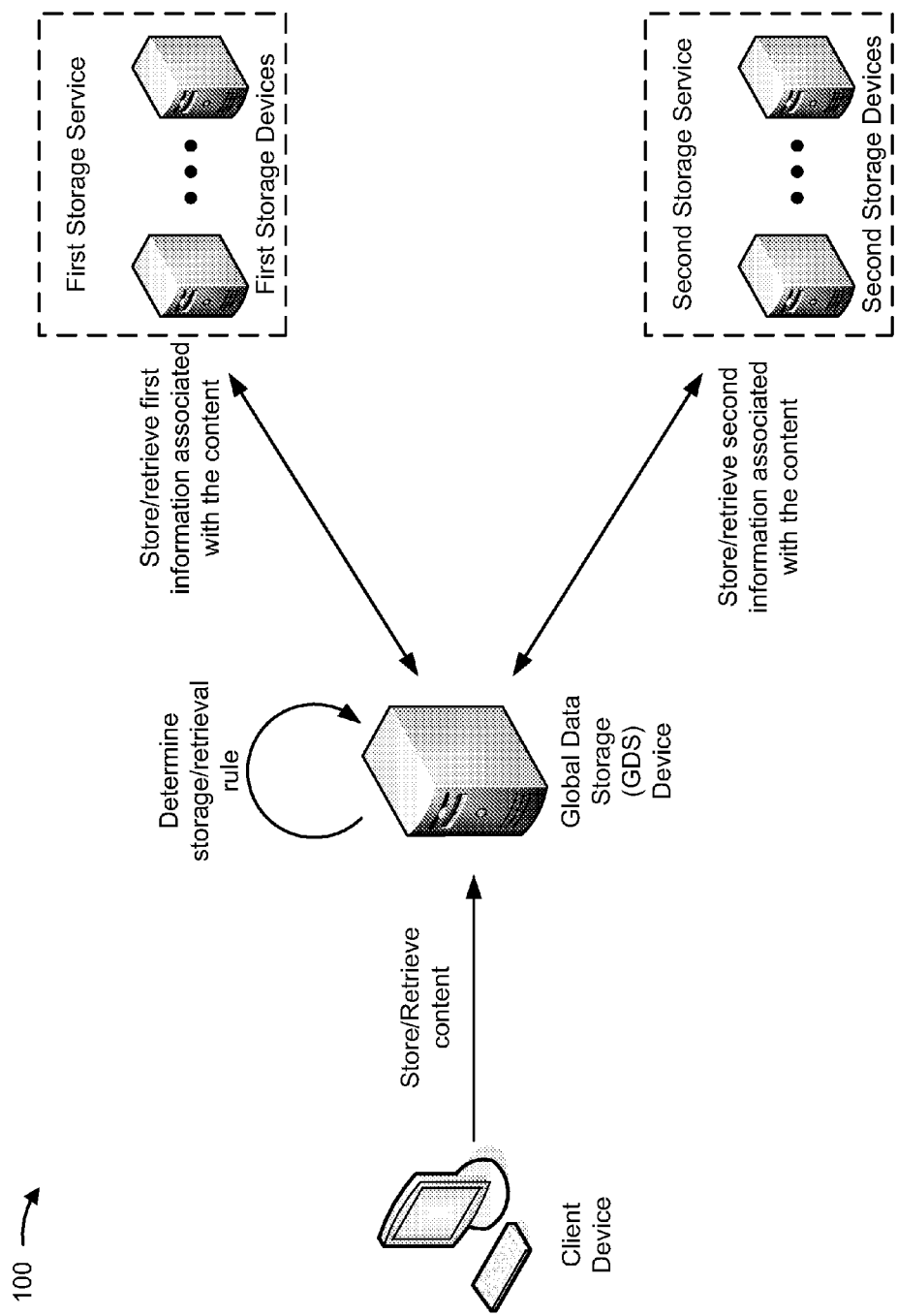
FIG. 1 is a diagram of an overview of an example implementation described herein.

FIG. 1 is a diagram of an overview of an example implementation 100 described herein. As shown in FIG. 1, example implementation 100 may include a client device, a global data storage (GDS) device, one or more first storage devices associated with a first storage service, and one or more second storage devices associated with a second storage service. In some implementations, the client device may include a desktop computer, a laptop computer, or the like. In some implementations, the GDS device and the storage devices may include a server. The first storage service and the second storage service may be designed in a different manner (e.g., the storage devices of each service may have a different architecture), such that each storage service provides different benefits, provides different features, satisfies different customer requirements, etc.

As further shown in FIG. 1, the GDS device may receive, from the client device, a request to store or retrieve content, such as a file to be stored by a server remote from the client device. The GDS device may determine a storage rule or a retrieval rule that specifies a manner in which the content is to be stored or retrieved. The storage or retrieval rule may be based on, for example, the content, a size of the content, a version of the content (e.g., a current version or a previous version), a user and/or client device 210 associated with the content, a customer requirement associated with the content, and/or other information associated with the content.

The storage or retrieval rule may identify first information, associated with the content, to be stored or retrieved from a storage device associated with the first storage service. The storage or retrieval rule may also identify second information, associated with the content, to be stored or retrieved from a second storage device associated with the second storage service. For example, the first storage device may store a current version of the content, and the second storage device may store a previous version (e.g., a non-current version) of the content. When the GDS device receives a request for a current version of the content, the GDS device may retrieve the content from the first storage device. When the GDS device receives a request for a previous version of the content, the GDS device may retrieve the content from the second storage device.

As another example, the first storage device may store a current version identifier that identifies a current version of the content, and the second storage device may store the content. When the GDS device receives a request for a current version of the content, the GDS device may retrieve content, based on the request, from the second storage device. The GDS device may determine whether the retrieved content is the current version of the content by comparing a version identifier of the retrieved content to the current version identifier stored by the first storage device. In some implementations, the GDS device may only provide the retrieved content to the client device when the retrieved content is the current version of the requested content. By storing and retrieving content in this manner, the GDS device may provide a storage solution capable of satisfying and/or guaranteeing particular customer requirements, such as latency and consistency requirements that are not provided by either of the first storage service or the second storage service.

Figure 2:
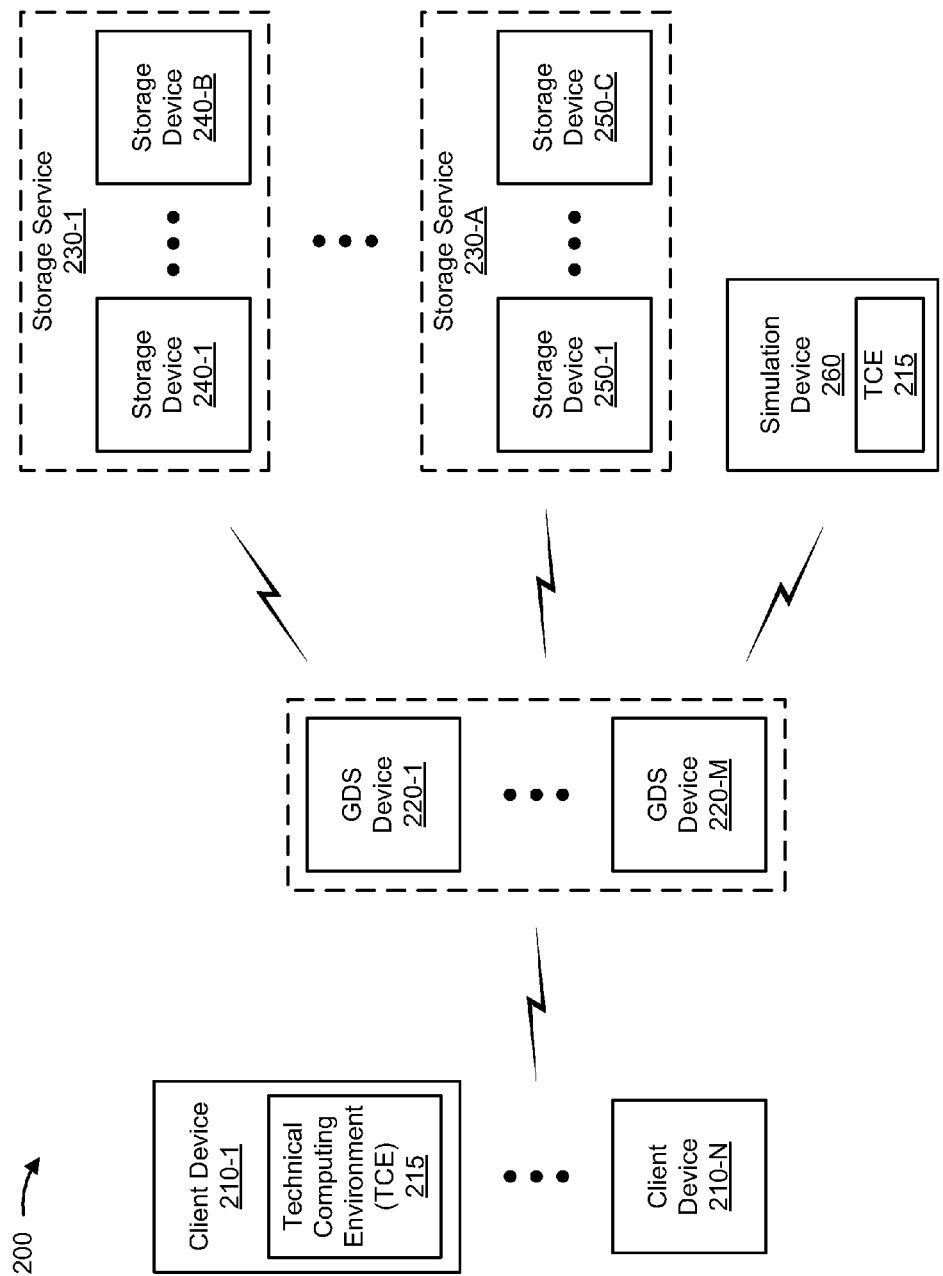
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210-1 through 210-N (N≥1) (hereinafter referred to collectively as "client devices 210," and individually as "client device 210"), which may include a technical computing environment (TCE) 215. Furthermore, environment 200 may include one or more GDS devices 220-1 through 220-M (M≥1) (hereinafter referred to collectively as "GDS devices 220," and individually as "GDS device 220"), and one or more storage services 230-1 through 230-A (A≥1) (hereinafter referred to collectively as "storage services 230," and individually as "storage service 230"). A first storage service (e.g., storage service 230-1) may include one or more storage devices 240-1 through 240-B (B≥1) (hereinafter referred to collectively as "storage devices 240" or "first storage devices 240," and individually as "storage device 240" or "first storage device 240"). A second storage service (e.g., storage service 230-A) may include one or more storage devices 250-1 through 250-C (C≥1) (hereinafter referred to collectively as "storage devices 250" or "second storage devices 250," and individually as "storage device 250" or "second storage device 250"). Furthermore, environment 200 may include a simulation device 260, which may include TCE 215. Devices of environment 200 may interconnect via wired connections, wireless connections, or a combination of wired and wireless connections.

Client device 210 may include a device capable of receiving or transmitting content. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to GDS device 220 (e.g., information associated with the content).

Client device 210 may host TCE 215. TCE 215 may include hardware-based logic or a combination of hardware-based logic and software-based logic that provides a computing environment that allows tasks to be performed (e.g., by users) related to disciplines, such as, but not limited to, mathematics, science, engineering, medicine, and business. TCE 215 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

GDS device 220 may include a device capable of receiving, storing, processing, and/or transmitting information associated with content. For example, GDS device 220 may include a computing device, such as a server, a desktop computer, a laptop computer, a tablet computer, a handheld computer, or a similar device. GDS device 220 may determine a storage rule or a retrieval rule associated with the content, and may transmit or receive information, associated with the content, to storage device 240 and/or storage device 250 based on the storage rule or the retrieval rule.

Storage service 230 may include a storage service provided by a service provider, such as a cloud storage service. In some implementations, different storage services 230 may be designed in a different manner (e.g., may have different architectures). For example, the storage devices included in storage service 230 (e.g., storage devices 240 and storage devices 250) may include different features, may have different capabilities, may store information in a different manner, may be connected in a different manner, may communicate in a different manner, etc.

Storage device 240 and storage device 250 may include a device capable of receiving, storing, processing, and/or transmitting information associated with content. For example, storage device 240/250 may include a computing device, such as a server, a desktop computer, a laptop computer, a tablet computer, a handheld computer, or a similar device. In some implementations, storage device 240 and storage device 250 may receive, from GDS device 220, different information, associated with the content, for storage. Additionally, or alternatively, storage device 240 and storage device 250 may transmit, to GDS device 220, different information, associated with the content. In some implementations, the information associated with the content may include the content and/or content metadata.

Simulation device 260 may include a device capable of simulating operation of a storage service and/or a storage device, such as storage service 230, storage device 240, and/or storage device 250. For example simulation device 260 may include a computing device, such as a server, a desktop computer, a laptop computer, a tablet computer, a handheld computer, or a similar device. Simulation device 260 may host TCE 215, in some implementations.

The number of devices shown in FIG. 2 is provided as an example. In practice, there may be additional, fewer, different, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
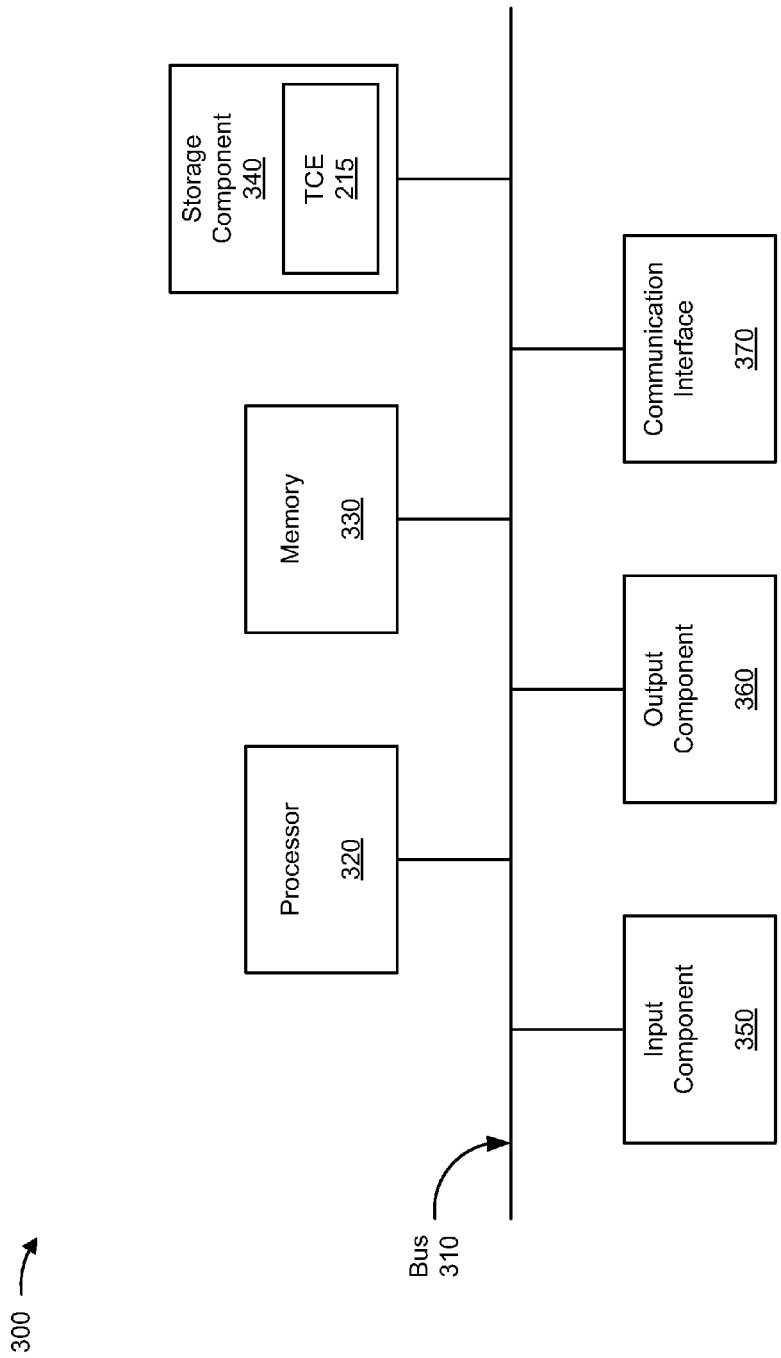
FIG. 3 is a diagram of example components of one or more devices of FIG. 2.

FIG. 3 is a diagram of example components of a device 300, which may correspond to client device 210, GDS device 220, storage device 240, storage device 250, and/or simulation device 260. Additionally, or alternatively, each of client device 210, GDS device 220, storage device 240, storage device 250, and/or simulation device 260 may include one or more devices 300 and/or one or more components of device 300. As illustrated in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 215.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

Figure 4:
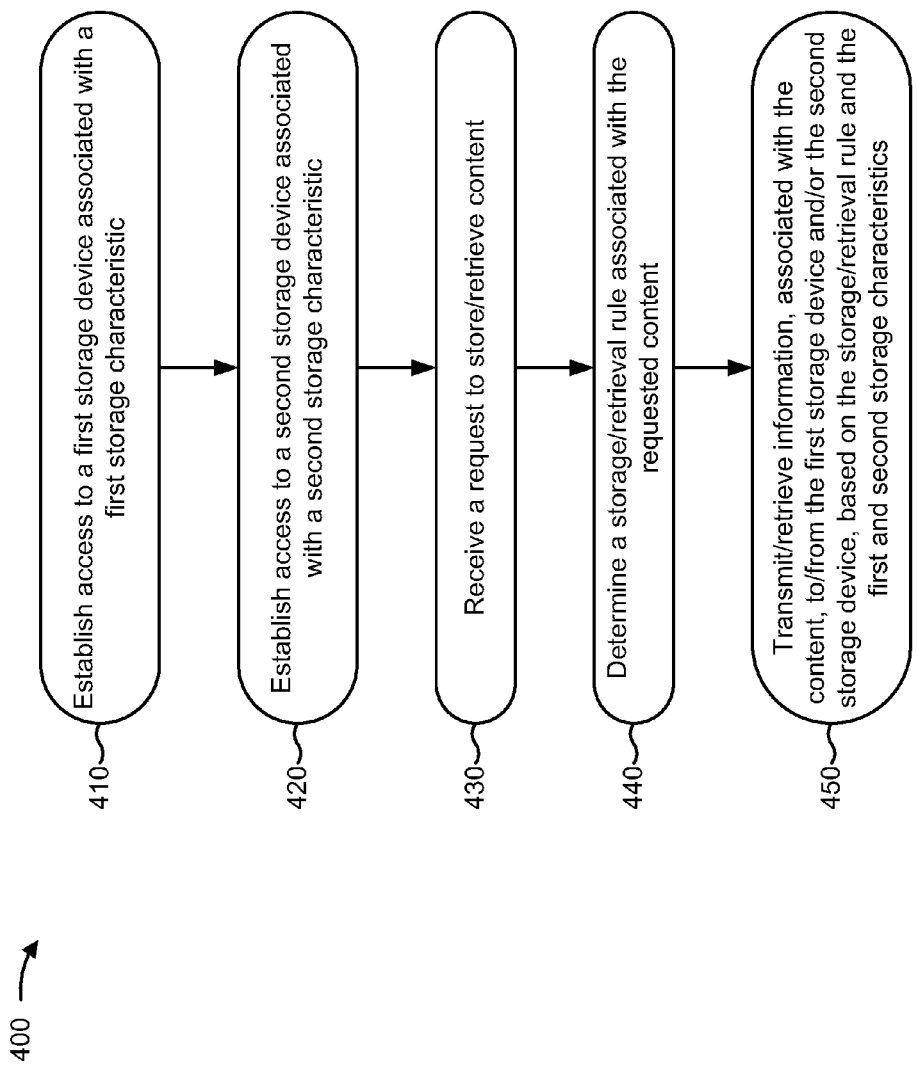
FIG. 4 is a flow chart of an example process for storing and retrieving content using different storage devices, based on storage and retrieval rules.

FIG. 4 is a flow chart of an example process 400 for storing and retrieving content using different storage devices, based on storage and retrieval rules. In some implementations, one or more process blocks of FIG. 4 may be performed by GDS device 220. In some implementations, one or more process blocks of FIG. 4 may be performed by another device or a group of devices separate from or including GDS device 220, such as client device 210, storage device 240, storage device 250, and/or simulation device 260.

As shown in FIG. 4, process 400 may include establishing access to a first storage device associated with a first storage characteristic (block 410), and establishing access to a second storage device associated with a second storage characteristic (block 420). For example, GDS device 220 may establish access to first storage device 240 and/or second storage device 250. In some implementations, GDS device 220 may register with multiple storage services 230, which may permit GDS device 220 to transmit information, for storage, to storage devices 240/250, and to retrieve information from storage devices 240/250. First storage device 240 may be associated with a first storage service 230, and second storage device 250 may be associated with a second storage service 230.

First storage device 240 and second storage device 250 may have different storage characteristics. For example, storage devices 240/250 may include different features, may have different capabilities, may store information in a different manner, may be connected in a different manner, may communicate in a different manner, may satisfy different requirements, may provide different performance and/or storage guarantees, etc. A storage characteristic may include, for example, a consistency characteristic, a latency characteristic, an availability characteristic, a cost characteristic, a capacity characteristic, a scalability characteristic, or another storage characteristic.

In some implementations, storage devices 240/250 may provide different consistency levels. Consistency, or a consistency level, as used herein, may refer to a property of storage service 230 (e.g., a set of storage devices 240/250) that describes when a change to stored content (e.g., an update to a file) is available to all users (e.g., client devices 210) with access to the stored content (e.g., across all client devices 210 and storage devices 240/250). For example, first storage device 240 may provide read-after-write consistency, where new stored content (e.g., a newly created file) is immediately available to all users. As another example, second storage device 250 may provide eventual consistency, where a change to stored content is available to all users after a particular amount of time has passed since the change was made (e.g., 500 milliseconds, 2 seconds, 5 minutes, etc.). The delay may be due to an amount of time required to propagate (e.g., receive, store, and transmit) the change among the entire set of storage devices 240/250. Before a particular storage device 240/250 receives the change, the particular storage device 240/250 may return stale content (e.g., content without the change) in response to a request for the content.

In some implementations, storage devices 240/250 may provide other levels of consistency, such as read-after-update consistency, where changes to existing content (e.g., an existing file, object, table, etc.) are immediately available to all users; read-after-delete consistency, where an attempt to read deleted content would fail immediately after the delete operation; complete consistency, where new content and edited content is immediately available, and attempts to read deleted content immediately fail; or other consistency levels.

In some implementations, storage devices 240/250 may provide different latency levels. Latency, or a latency level, as used herein, may refer to a property of storage service 230 (e.g., a set of storage devices 240/250) that describes an amount of time it takes for storage device 240/250 to process and/or respond to a request (e.g., an amount of time to service a request). In some implementations, latency may refer to an amount of time between when a change is made to stored content and when the change is available (e.g., readable) to all users (e.g., all client devices 210 with access to the content).

In some implementations, storage devices 240/250 may provide different availability characteristics. Availability, as used herein, may refer to a property of storage service 230 that describes whether the storage devices in storage service 230 are available for information storage and/or retrieval. In some implementations, availability may be described as a percentage of uptime or downtime, or an availability over a particular time period (e.g., a downtime of one hour per year).

Storage devices 240/250 may provide different cost characteristics, in some implementations. For example, storing information on first storage device 240 may be more expensive or less expensive (e.g., per byte) than storing information on second storage device 250. In some implementations, storage devices 240/250 may provide different capacity characteristics. For example, first storage device 240 may provide more or less capacity than second storage device 250. Additionally, or alternatively, storage devices 240/250 may provide different scalability characteristics. For example, first storage device 240 may be better or worse at handling growth (e.g., growth in the amount of information stored, growth in the quantity of users and/or client devices 210 served, etc.) than second storage device 250. A scalability characteristic may include, in some implementations, a quantity of read and/or write operations capable of being performed by storage device 240/250 in a particular amount of time (e.g., a quantity of reads/writes per second).

As shown in FIG. 4, process 400 may include receiving a request to store or retrieve content (block 430), and determining a storage rule or a retrieval rule associated with the requested content (block 440). For example, GDS device 220 may receive, from client device 210 a request to store content. Content, as used herein, may refer to any information that may be stored (e.g., by storage device 240/250), including a file or a portion of a file, a document or a portion of a document, an object or a portion of an object, an artifact, a script, program code, etc., and may include textual information, graphical information, etc. GDS device 220 may determine a storage rule associated with the content.

The storage rule may be based on, for example, the content, a size of the content, a name of the content, a location where the content is stored, a type of the content, a version of the content, a client device 210 from which the request is received, a storage characteristic of storage service 230, storage device 240, and/or storage device 250, a user associated with the requested content (e.g., a user requesting that the content be stored or retrieved, a user who authored the content, etc.), a customer requirement associated with the content, or other information associated with the content and/or the request.

In some implementations, the storage rule may specify a manner in which GDS 220 is to transmit the content for storage by first storage device 240 and/or second storage device 250. For example, the storage rule may specify first information (e.g., a portion of the content, information that identifies the content, etc.) that is to be transmitted by GDS device 220 to first storage device 240 for storage. Additionally, the storage rule may specify second information (e.g., a different portion of the content, an entirety of the content, etc.) that is to be transmitted by GDS device 220 to second storage device 250 for storage. In some implementations, the first information and the second information may include different information. Alternatively, the first information and the second information may include the same information (e.g., may include the content), or may include some information that is different and some information that is the same. In some implementations, the storage rule may be specified by a user providing input to client device 210 and/or GDS device 220.

Similarly, GDS device 220 may receive, from client device 210, a request to retrieve content, and may determine a retrieval rule associated with the content. The retrieval rule may be based on the same information as the storage rule, discussed above, and may specify a manner in which GDS device 220 is to retrieve the content from first storage device 240 and/or second storage device 250.

As an example, the storage/retrieval rule may specify that a current version of content by stored by or retrieved from first storage device 240, and that previous versions of content be stored by or retrieved from second storage device 250. As another example, the storage/retrieval rule may specify that content metadata and/or a content version identifier by stored by or retrieved from first storage device 240, and that the actual content (e.g., a current version and/or previous versions) be stored by or retrieved from second storage device 250. As another example, the storage/retrieval rule may specify that content above a size threshold be stored by or retrieved from first storage device 240, and that content below the size threshold be stored by or retrieved from second storage device 250.

As another example, the storage/retrieval rule may specify that content matching a particular content type (e.g., a file type and/or file format) be stored by or retrieved from first storage device 240, and that content not matching the particular content type be stored by or retrieved from second storage device 250. As another example, the storage/retrieval rule may specify that content, associated with requests from a particular user and/or client device 210, be stored by or retrieved from first storage device 240, and that content, associated with requests from other users and/or client devices 210, be stored by or retrieved from second storage device 250.

In some implementations, the storage/retrieval rule may be based on a customer requirement and/or a guarantee made to a particular customer. For example, a customer may be guaranteed read-after-write consistency for particular content. When client device 210 receives a request from the customer to store or retrieve the particular content, client device 210 may store or retrieve the particular content to/from first storage device 240 that provides read-after-write consistency. Alternatively, a customer may be guaranteed eventual consistency for particular content. When client device 210 receives a request from the customer to store or retrieve the particular content, client device 210 may store or retrieve the particular content to/from second storage device 250 that provides eventual consistency.

Client device 210 may operate in a similar fashion for storage/retrieval rules that are based on other customer requirements and/or guarantees, such as a latency requirement/guarantee, an availability requirement/guarantee, a cost requirement/guarantee, a capacity requirement/guarantee, a scalability requirement/guarantee, or another requirement/guarantee. The storage/retrieval rules may be determined to guarantee that the customer requirements are met.

As further shown in FIG. 4, process 400 may include transmitting or retrieving information, associated with the content, to or from the first storage device and/or the second storage device, based on the storage rule and/or the retrieval rule, and based on the first and second storage characteristics (block 450). For example, GDS device 220 may transmit first information, associated with the content, to first storage device 240, and may transmit second information, associated with the content, to second storage device 250, based on the storage rule, the first storage characteristic associated with first storage device 240, and/or the second storage characteristic associated with second storage device 250.

In some implementations, GDS device 220 may transmit a current version of the content to a first storage device 240 that provides a higher consistency level (e.g., read-after-write consistency), and may transmit a previous version of the content to a second storage device 250 that provides a lower consistency level (e.g., eventual consistency). Additionally, or alternatively, GDS device 220 may transmit metadata associated with the content (e.g., a content identifier, a content version identifier, a name of the content, a user associated with the content, a size of the content, a date and/or time that the content was created, edited, stored, etc., a location where the content is stored, a type of the content, etc.) to the first storage device 240, and may transmit the content (e.g., the actual content) to the second storage device 250. First storage device 240 and second storage device 250 may store the respective information received from GDS device 220.

Similarly, GDS device 220 may receive a request for content. Based on the request, GDS device 220 may retrieve (e.g., by requesting and receiving a response) the first information from first storage device 240, and may retrieve the second information from second storage device 250, based on the retrieval rule, the first storage characteristic associated with first storage device 240, and/or the second storage characteristic associated with second storage device 250.

In some implementations, GDS device 220 may determine whether the requested content (e.g., requested by client device 210) is a request for a current version of the content, or a request for a previous version of the content. If the request is for the current version, GDS device 220 may retrieve the first information (e.g., the current version of the content) from first storage device 240 that provides a higher consistency level (e.g., read-after-write consistency). If the request is for a previous version of the content, GDS device 220 may retrieve the second information (e.g., the previous version of the content) from second storage device 250 that provides a lower consistency level (e.g., eventual consistency).

As another example, GDS device 220 may receive a request for content, and may retrieve a current version identifier from first storage device 240. The current version identifier may include information that identifies a current version of the content (e.g., a date and/or time at which the current version was created, modified, etc., a name associated with the current version, a version number associated with the current version, etc.). GDS device 220 may retrieve content, identified in the request, from the second storage device 250. GDS device 220 may compare a version identifier of the retrieved content to the current version identifier, retrieved from first storage device 240, to determine whether the retrieved content is the most current version of the content.

If the retrieved content is not the most current version of the content, GDS device 220 may wait a particular amount of time before again retrieving content, identified in the request, from second storage device 250, and comparing a version identifier of the retrieved content to the current version identifier. Additionally, or alternatively, GDS device 220 may retrieve content, identified in the request, from a different storage device 250 (e.g., in the set of storage devices 250 associated with a particular storage service 230), and may compare a version identifier of the retrieved content to the current version identifier. If the retrieved content is the most current version of the content, GDS device 220 may transmit the retrieved content to client device 210.

As another example, GDS device 220 may balance availability and consistency. For example, first storage devices 240 may store three copies (or some other number of multiple copies) of content on three different first storage devices 240. If two of the three storage devices 240 are down, then GDS device 220 may not be able to provide read-after-write consistency, since if the third storage device goes down, any updates that were stored on the third device would be lost. In this situation, GDS device 220 may refuse to accept storage requests (e.g., of updates), which would in a loss of availability. However, for less critical content (e.g., administrative information, metadata, etc.), GDS may maintain availability by accepting storage requests for the less critical content.

The above are merely some examples of how GDS device 220 may balance or trade off competing requirements. In some implementations, GDS device 220 may balance requirements in other ways to provide guarantees that are not provided by individual storage services. Additionally, while some implementations have been described herein with respect to first and second storage devices, storage services, and storage characteristics, other implementations may include more than two storage devices, storage services, and storage characteristics.

While a series of blocks has been described with regard to FIG. 4, the blocks and/or the order of the blocks may be modified in some implementations. Additionally, or alternatively, non-dependent blocks may be performed in parallel.

Figure 5A:
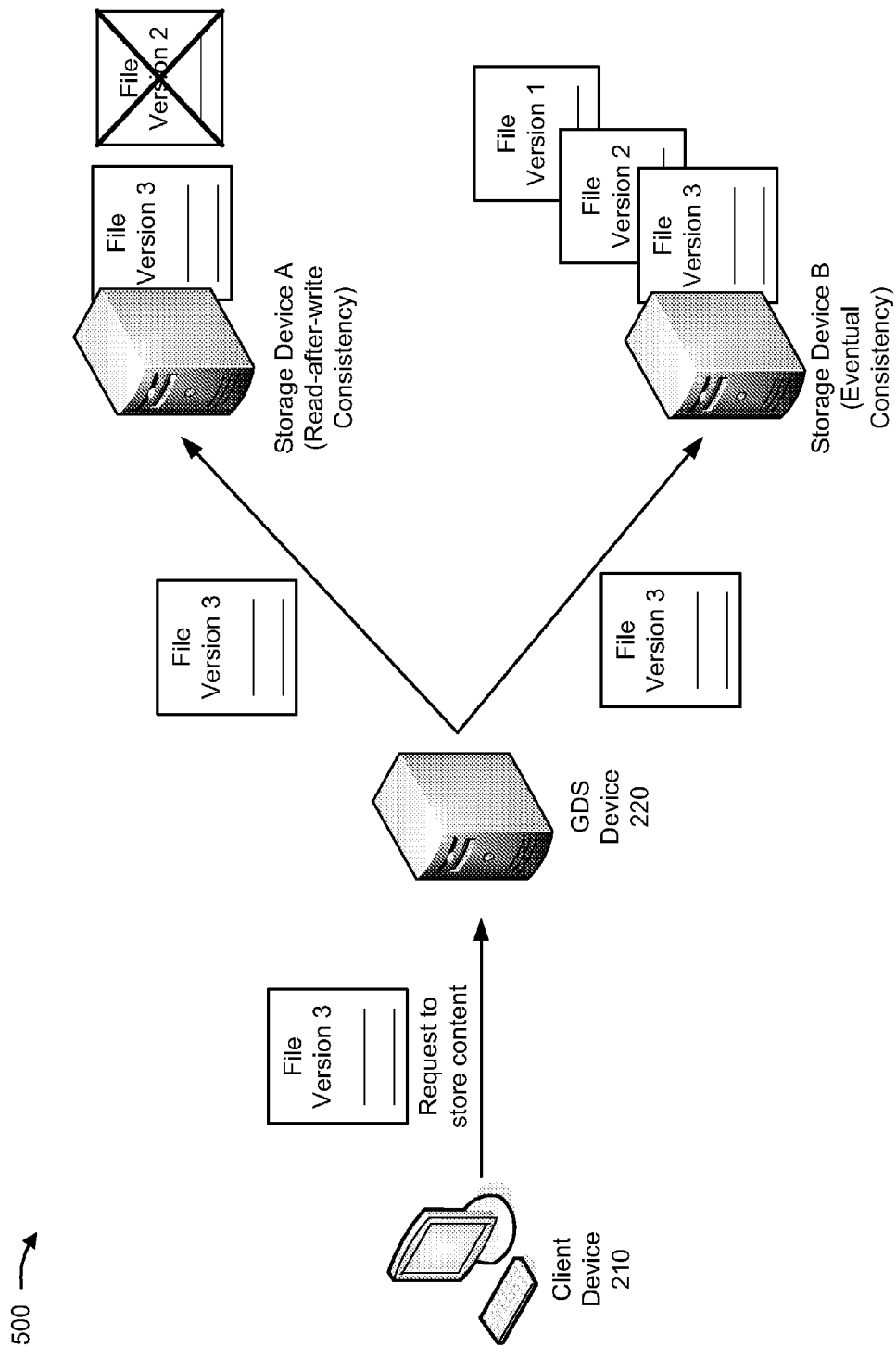
FIGS. 5A and 5B are diagrams of an example implementation relating to the example process shown in FIG. 4.
Figure 5B:
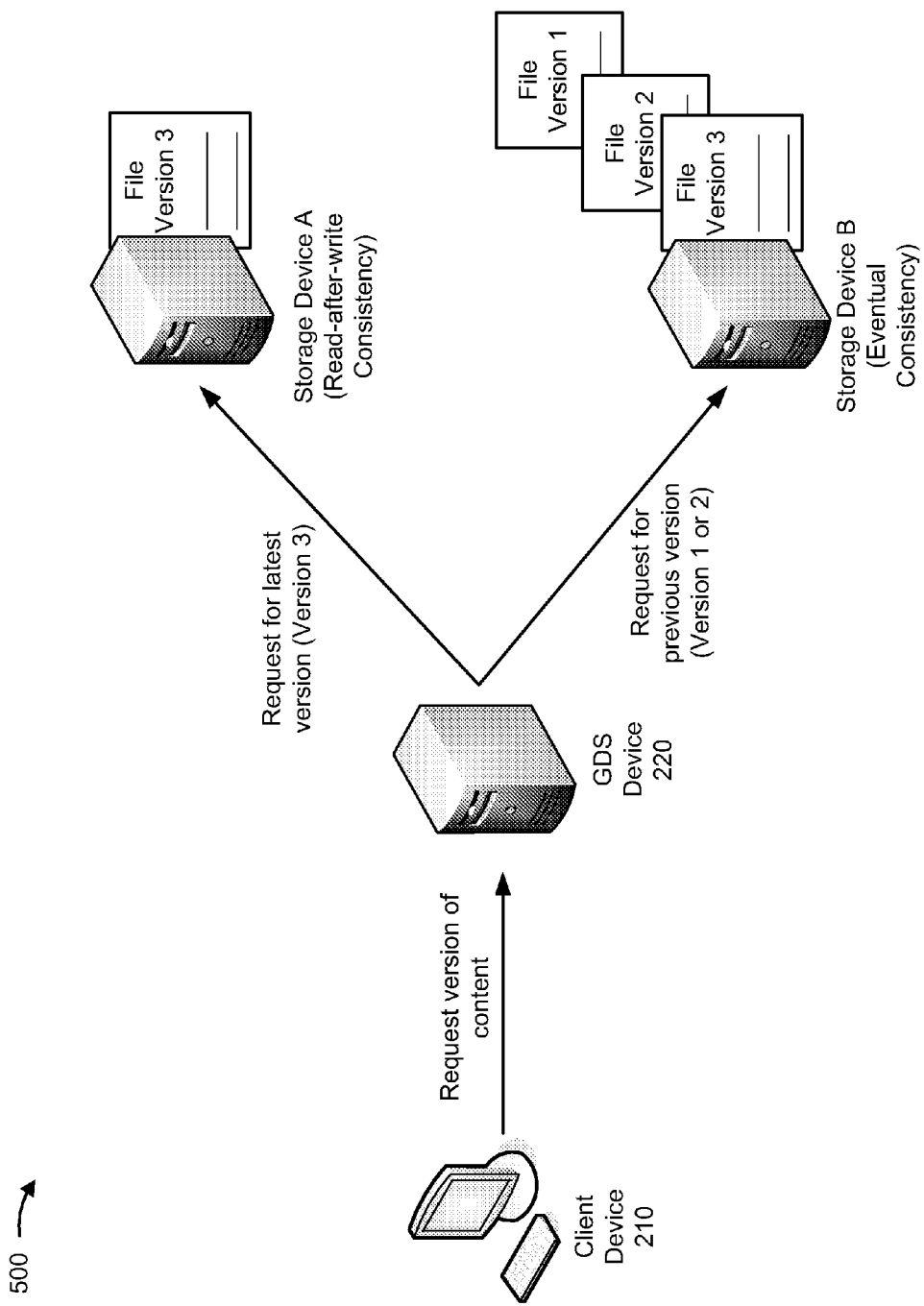

FIGS. 5A and 5B are diagrams of an example implementation 500 relating to example process 400 (FIG. 4).

As shown in FIG. 5A, assume that client device 210 transmits, to GDS device 220, a request to store content, identified as "File Version 3." File Version 3 may be the current version of the content. Based on determining that File Version 3 is the current version of the content, GDS device 220 may transmit the content (e.g., File Version 3) to storage device A, which may be associated with a set of storage devices (e.g., a storage service) providing read-after-write consistency. GDS device 220 may also transmit, to storage device A, instructions to delete previous versions of the content. Based on the information received from GDS device 220, storage device A may store File Version 3, and may delete File Version 2.

As further shown in FIG. 5A, GDS device 220 may transmit File Version 3 to storage device B, which may be associated with a set of storage devices (e.g., a storage service) providing eventual consistency. Storage device B may store File Version 3, and may also store previous versions of the content, such as File Version 2 and File Version 1.

As shown in FIG. 5B, assume that at a later time, client device 210 transmits, to GDS device 220, a request for a particular version of the content. As shown, if the request is for the latest version (e.g., a request for version 3), then GDS device 220 may request the content from storage device A. Alternatively, if the request is not for the latest version (e.g., a request for versions 1 or 2), then GDS device 220 may request the content from storage device B. In some implementations, storage devices A and B may include storage devices with other storage characteristics, such as other consistency levels, different latency characteristics, different availability characteristics, different cost characteristics, etc.

In some implementations, storage device A may include a document-oriented, not-only-structured-query-language (NoSQL) database, such as MongoDB, that provides read-after-write consistency and atomic operations (e.g., read, write, modify, delete, etc. operations do not interfere with one another; only one operation may be performed at a time). Storage device A may be used to store current versions of content, as shown. In some implementations, storage device B may include a cloud-based storage system, such as Amazon Simple Storage Service (S3), that provides eventual consistency. Storage device B may be used to store previous versions of content, as shown. Additionally, or alternatively, storage device B may be used to store backup copies of content for disaster recovery purposes. In some implementations, storage device B may be less costly and/or may have a higher latency (e.g., may be slower) than storage device A. By distributing content, and/or information associated with content, between storage device A and storage device B, GDS device 220 may provide the benefits of both storage devices to client device 210.

Figure 6A:
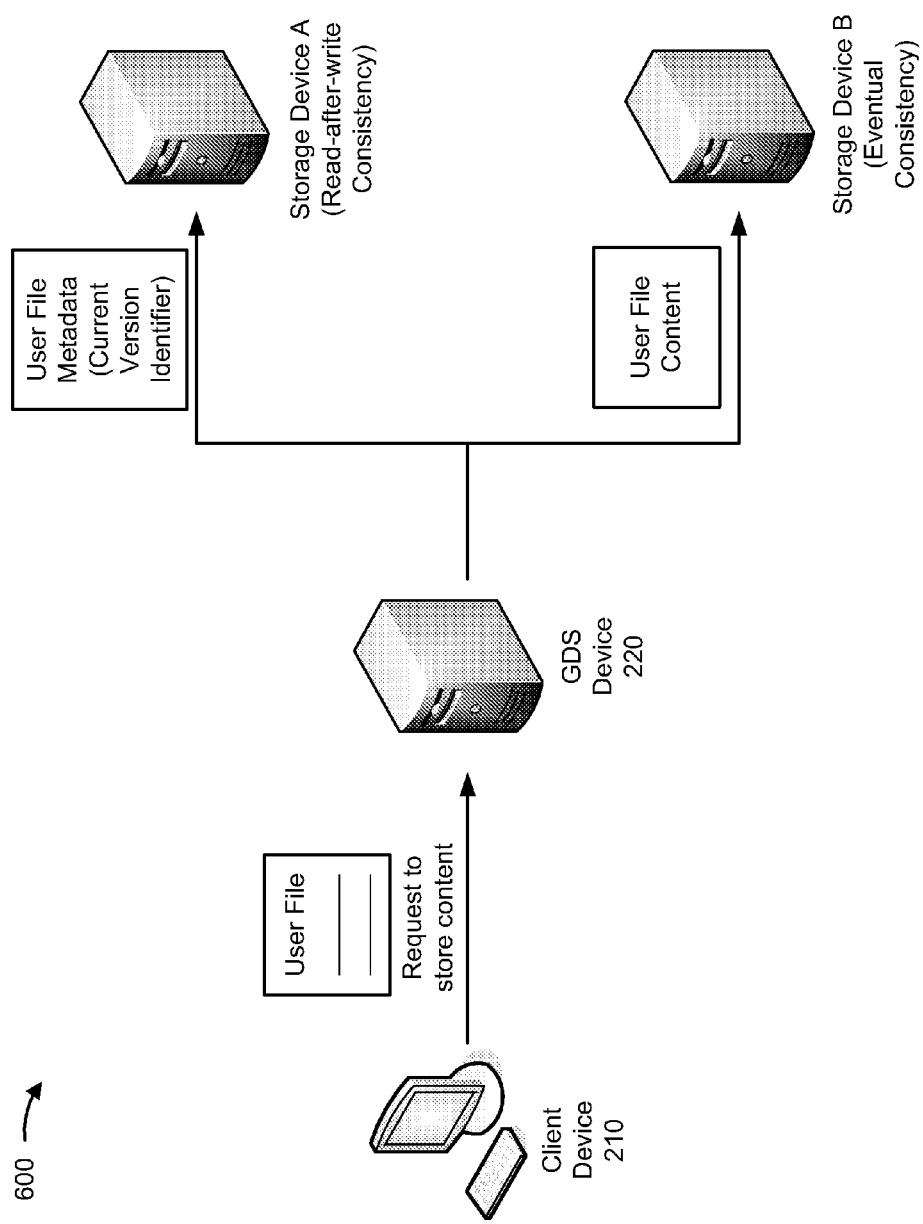
FIGS. 6A and 6B are diagrams of another example implementation relating to the example process shown in FIG. 4.
Figure 6B:
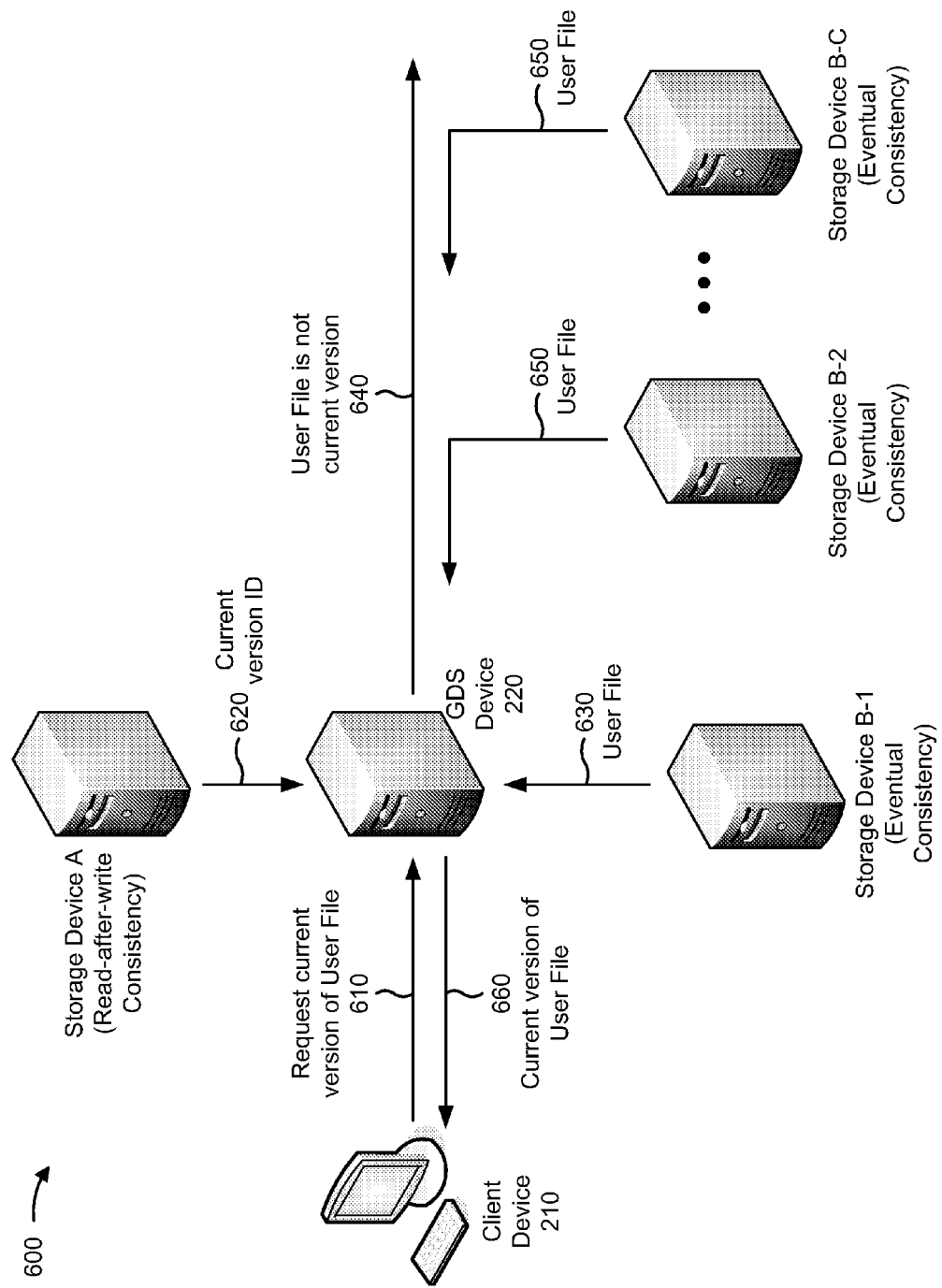

FIGS. 6A and 6B are diagrams of another example implementation 600 relating to example process 400 (FIG. 4).

As shown in FIG. 6A, assume that client device 210 transmits, to GDS device 220, a request to store content, identified as "User File." Based on the request, GDS device 220 may transmit metadata, associated with the content, to storage device A, which provides read-after-write consistency. The metadata may include a current version identifier that identifies a current version of the User File (e.g., a date and/or time that the User File was created, a version number of the User File, etc.). GDS device 220 may also transmit the content (e.g., the User File) to storage device B, which provides eventual consistency. Storage device A may store the metadata, and storage device B may store the content.

As shown in FIG. 6B (reference number 610), assume that at a later time, client device 210 transmits, to GDS device 220, a request for a current version of the User File. As shown by reference number 620, GDS device 220 may retrieve, from storage device A, the current version identifier associated with the User File. As shown by reference number 630, GDS device 220 may retrieve the User File, identified in the request from client device 210, from storage device B-1.

In some implementations, the retrieved User File may not be the current version of the User File because the current version may not have propagated throughout the entire set of storage devices (e.g., B-1, B-2, . . . , B-C). In this scenario, GDS device 220 may determine that the User File is not the current version because version identifier information in the User File does not match the current version identifier, as shown by reference number 640. Based on this determination, GDS device 220 may wait a particular amount of time, and may again retrieve the User File from storage device B-1. Additionally, or alternatively, GDS device 220 may retrieve the User File from another storage device associated with a same storage service as storage device B-1, such as storage device B-2 or storage device B-C, as shown by reference number 650.

In other implementations, the retrieved User File may be the current version of the User File. In this scenario, GDS device 220 may determine that the User File is the current version because version identifier information in the User File matches the current version identifier. Based on determining that the User File is the current version, GDS device 220 may transmit the User File to client device 210, as shown by reference number 660.

GDS device 220 may retrieve information as shown in FIG. 6B based on a retrieval rule. The retrieval rule may be based on, for example, a user requirement received by GDS device 220. For example, GDS device 220 may receive a user requirement specifying that requested content be read-after-write consistent. Based on the user requirement, GDS device 220 may retrieve content for the user as shown in FIG. 6B.

Alternatively, GDS device 220 may receive a user requirement that content be retrieved as quickly as possible (e.g., low latency), and that eventual consistency is permitted for content retrieval. In this scenario, GDS device 220 may provide the retrieved content to client device 210 without determining whether the retrieved content is the current version of the content.

FIG. 7 is a flow chart of an example process 700 for testing a storage system that provides eventual consistency. In some implementations, one or more process blocks of FIG. 7 may be performed by simulation device 260. In some implementations, one or more process blocks of FIG. 7 may be performed by another device or a group of devices separate from or including simulation device 260, such as client device 210, GDS device 220, storage device 240, and/or storage device 250.

As shown in FIG. 7, process 700 may include receiving a model of a system that provides eventual consistency, the model including a parameter that describes a behavior of the system (block 710). For example, simulation device 260 (e.g., TCE 215) may receive a request, from a user of simulation device 260, to access the model. The request may include information identifying the model, such as a name of the model, and information identifying a memory location at which the model is stored. The memory location may be located within simulation device 260 or external to, and possibly remote from, simulation device 260. Simulation device 260 may, based on receiving the request, retrieve the model from the memory location. In some implementations, simulation device 260 may provide, for display, a user interface that depicts all or a portion of the model. The model may include a model of a system that provides eventual consistency, such as a set of storage devices that propagate content to one another until every storage device in the set stores a current version of the content.

The model may include a parameter that describes a behavior of the system (e.g., with respect to achieving eventual consistency). For example, the parameter may describe a manner in which information is propagated through the set of storage devices (e.g., a speed, bandwidth, latency, etc., associated with a connection between storage devices in the set), an amount of time between a change to content and when the change has been propagated to a particular percentage of storage devices in the set (e.g., 50%, 100%, all devices in the set, etc.), a duration for propagation of content and/or content changes to all storage devices in the set, a quantity of storage devices in the set (e.g., a size of the set), a probably and/or percentage of instances in which stale content (e.g., non-current versions of the content) is retrieved from the set of storage devices based on a request for current content, a latency associated with one or more storage devices, a quantity of stale content versions stored by the storage devices, a quantity of storage requests within a particular time period, a quantity of retrieval requests within a particular time period, an error rate, a load on the system, and/or another parameter of the modeled system.

As further shown in FIG. 7, process 700 may include receiving information that identifies a parameter value of the parameter (block 720), and executing the model, based on the parameter value, to simulate operation of the system (block 730). For example, simulation device 260 (e.g., TCE 215) may receive user input that specifies a parameter value of the parameter. The parameter value may specify an actual value for the parameter, a default value for the parameter, a minimum value for the parameter, a maximum value for the parameter, an average value for the parameter, a random value for the parameter, one or more threshold values for the parameter, a function used to determine a value for the parameter, and/or the like.

Simulation device 260 may execute the model using the parameter value for the parameter. The model may include a graphical model (e.g., a block diagram model), a textual model, etc., and simulation device 260 may execute the model by executing program code that describes the model. The behavior of the executed model may be based on the parameter value. In some implementations, simulation device 260 may receive a request, from client device 210 and/or GDS device 220, to store and/or retrieve content, may execute the model based on the received request, and may return a result of executing the model (e.g., to client device 210 and/or GDS device 220).

As further shown in FIG. 7, process 700 may include generating a result, based on executing the model (block 740), and generating a storage rule and/or a retrieval rule based on the result (block 750). For example, simulation device 260 may return a result of executing the model. The result may include information associated with one or more consistency faults that occurred during model execution. A consistency fault, as used herein, may refer to an instance when a request for current content is transmitted to a storage device (e.g., of a set of storage devices), and stale content (e.g., a previous version of the content) is received from the storage device. The result may include, for example, a quantity of consistency faults that occurred during execution of the model, a percentage of requests that resulted in a consistency fault during execution of the model, one or more parameter values associated with one or more consistency faults, etc.

Additionally, or alternatively, the result may describe the simulation scenarios that resulted in a particular consistency level, such as read-after-write consistency. For example, the result may indicate parameter values that, when simulated with the model, provided read-after-write consistency. These scenarios may be used to provide consistency guarantees to users of the system.

In some implementations, simulation device 260 may use the result to generate a storage rule and/or a retrieval rule. For example, simulation device 260 may simulate different storage and/or retrieval rules during model execution, and may generate results associated with the different storage and/or retrieval rules. Simulation device 260 may determine a storage and/or retrieval rule that generates the best result (e.g., fewest consistency faults, fewest errors, lowest latency, least cost, etc.), and may provide the determined storage and/or retrieval rule to GDS device 220. GDS device 220 may use the determined storage and/or retrieval rule to handle requests for storage and/or retrieval (e.g., received from client device 210).

In some implementations, simulation device 260 may receive information that identifies a customer requirement, such as a consistency requirement, a latency requirement, an availability requirement, a cost requirement, a capacity requirement, a scalability requirement, and/or another requirement. Simulation device 260 may simulate different storage/retrieval rules to determine rules that satisfy the customer requirement, and may determine a storage/retrieval rule that guarantees that the customer requirement is met.

While a series of blocks has been described with regard to FIG. 7, the blocks and/or the order of the blocks may be modified in some implementations. Additionally, or alternatively, non-dependent blocks may be performed in parallel.

Figure 8:
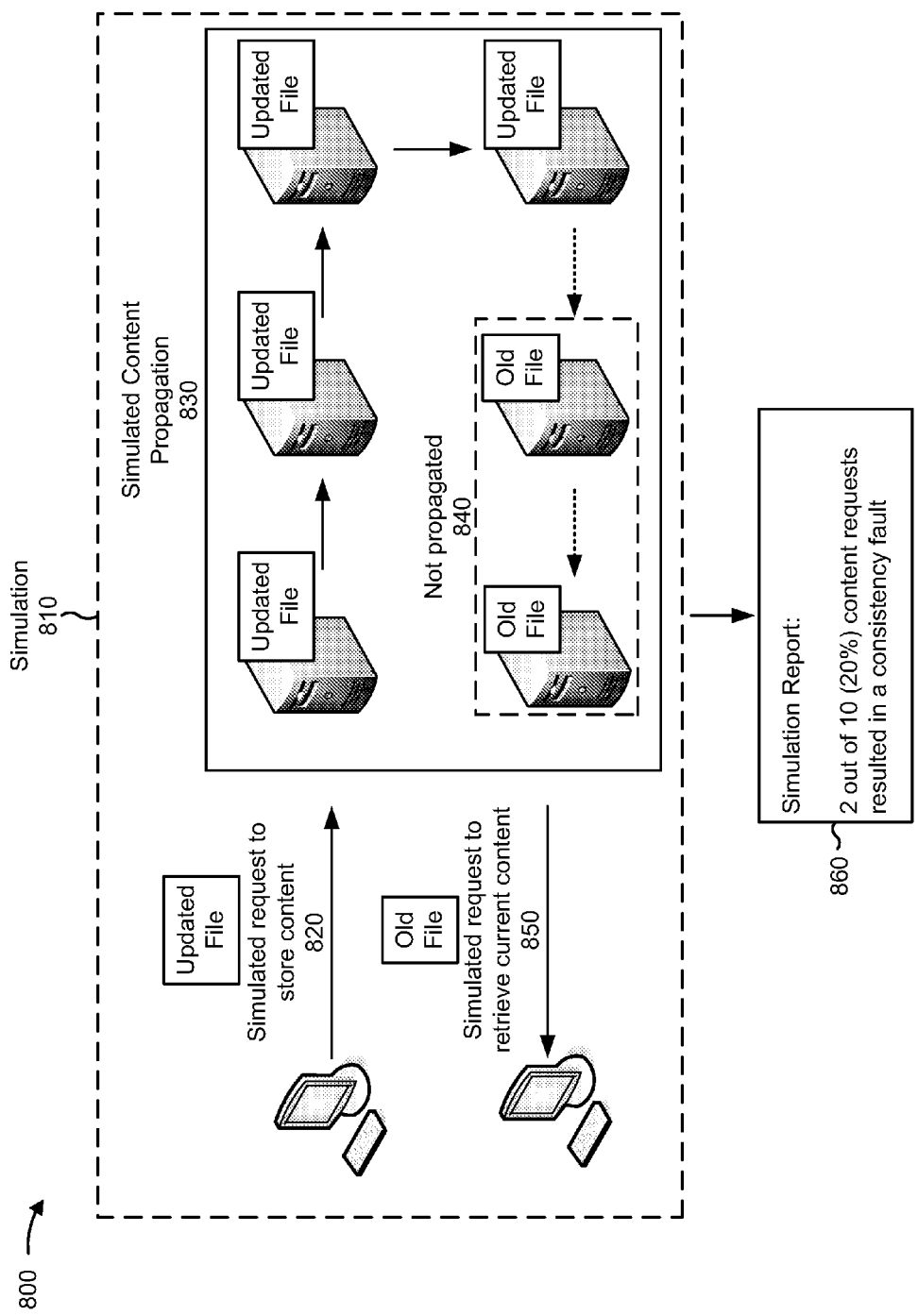
FIG. 8 is a diagram of an example implementation relating to the example process shown in FIG. 7.

FIG. 8 is a diagram of an example implementation 800 relating to example process 700 (FIG. 7). FIG. 8 depicts an example simulation of a system that provides eventual consistency, and an example result generated based on the simulation.

As shown by reference number 810, simulation device 260 may simulate an eventually-consistent system by executing a model of the system. The simulation may include one or more simulated requests to store updated content, one or more simulated requests to retrieve current content, and a simulated propagation of updated content through a set of storage devices that provide eventual consistency.

For example, simulation device 260 may simulate a request (or may receive an actual request from client device 210 and/or GDS device 220) to store an update to content, such as new information in a file identified as "Updated File," as shown by reference number 820. As shown by reference number 830, simulation device 260 may simulate propagation (e.g., receiving, storing, and transmitting) of the Updated File through a set of storage devices. As shown by reference number 840, in some simulation instances, the Updated File may not be propagated through the entire set of storage devices before a simulated request (or an actual request received from client device 210 and/or GDS device 220) for the current content is received. As shown by reference number 850, the simulated set of storage devices may return stale content, identified as "Old File," in response to the request for current content. This event may be identified as a consistency fault.

In some implementations, simulation device 260 may perform multiple simulation instances (e.g., may simulate the operations shown by reference numbers 820, 830, and/or 850), and may provide a report associated with the multiple simulation instances, as shown by reference number 860. For example, the report may identify that 2 out of 10 (20%) content requests resulted in a consistency fault during model execution.

Implementations described herein combine multiple storage services in a manner that provides the benefits of each storage service, which allows customer requirements, such as latency or consistency requirements, to be satisfied. For example, by combining multiple storage services, GDS device 220 may be capable of providing low latency (e.g., sub-second request latency), content-dependent consistency (e.g., read-after-write consistency for current content, eventual consistency for prior versions of content), high availability (e.g., 99.99% availability), high capacity (e.g., 1,200 concurrent sessions, support for 60,000 users), support for large files, and other benefits.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
establish access to a first set of storage devices associated with a first storage characteristic;
establish access to a second set of storage devices associated with a second storage characteristic,
the first storage characteristic and the second storage characteristic including at least one of:
a consistency characteristic, or
a latency characteristic, the first storage characteristic and the second storage characteristic being different;
receive a first request to store content;
determine a storage rule associated with the content, based on the first storage characteristic and the second storage characteristic,
the storage rule specifying a manner in which first information, associated with a first version of the content, is to be stored in the first set of storage devices and in which second information, different than the first information and including a second version of the content, is to be stored in the second set of storage devices based on a same request to store the content;
transmit the first information, associated with the first version of the content, to a first storage device of the first set of storage devices, based on the storage rule and the first request to store the content; and
transmit the second information, different than the first information and including the second version of the content, to a second storage device of the second set of storage devices, based on the storage rule and the first request to store the content.

2. The device of claim 1,
where the first set of storage devices provides read-after-write consistency; and
where the second set of storage devices provides eventual consistency.

3. The device of claim 1, where the first version of the content is a current version of the content and the second version of the content is a previous version of the content,
where the first information includes the current version of the content;
where the second information includes the previous version of the content; and
where the one or more processors are further to:
receive a second request to retrieve the content;
determine whether the second request is for the current version of the content or the previous version of the content;
when the second request is for the current version of the content, retrieve the current version of the content from at least one storage device of the first set of storage devices; and
when the second request is for the previous version of the content, retrieve the previous version of the content from at least one storage device of the second set of storage devices.

4. The device of claim 1, where the first version of the content is a current version of the content,
where the first information includes information that identifies the current version of the content; and
where the one or more processors are further to:
receive, from a client device, a second request to retrieve the content,
the second request including a content identifier;
retrieve, from at least one storage device of the first set of storage devices, the information that identifies the current version of the content;
retrieve third information from at least one storage device of the second set of storage devices, based on the content identifier;
determine, based on the information that identifies the current version of the content, whether the third information is the current version of the content;
when the third information is the current version of the content, provide the third information to the client device; and
when the third information is not the current version of the content, retrieve fourth information, based on the content identifier.

5. The device of claim 4, where the one or more processors, when retrieving the fourth information, are further to at least one of:
retrieve the fourth information from the at least one storage device of the second set of storage devices after a particular amount of time has passed since retrieving the third information; or
retrieve the fourth information from one or more storage devices, of the second set of storage devices, other than the at least one storage device of the second set of storage devices from which the third information was retrieved.

6. The device of claim 1, where the one or more processors are further to:
receive a model that includes a parameter that describes a behavior of the second set of storage devices,
the second set of storage devices providing eventual consistency;
receive information that identifies a parameter value for the parameter;
execute the model, based on the parameter value, to simulate storage of simulated content to, and retrieval of the simulated content from, the second set of storage devices;
generate a result, based on executing the model, that identifies information associated with consistency faults; and
provide the result.

7. The device of claim 6, where the one or more processors are further to:
determine the storage rule based on the result.

8. A computer-readable medium storing instructions, the instructions comprising:
one or more instructions that, when executed by a processor, cause the processor to:
establish access to a first set of storage devices associated with a first storage characteristic;
establish access to a second set of storage devices associated with a second storage characteristic,
the first set of storage devices being different from the second set of storage devices,
the first storage characteristic being different from the second storage characteristic,
the first storage characteristic and the second storage characteristic including at least one of:
a consistency characteristic, or
a latency characteristic;
receive a first request to store content;
determine a storage rule associated with the content, based on the first storage characteristic and the second storage characteristic,
the storage rule specifying a manner in which first information, associated with a first version of the content, is to be stored in the first set of storage devices and in which second information, different than the first information and including a second version of the content, is to be stored in the second set of storage devices based on a same request to store the content;
transmit the first information, associated with the first version of the content, to a first storage device of the first set of storage devices, based on the storage rule and the first request to store the content; and
transmit the second information, different than the first information and including the second version of the content, to a second storage device of the second set of storage devices, based on the storage rule and the first request to store the content.

9. The computer-readable medium of claim 8,
where the first set of storage devices provides read-after-write consistency; and
where the second set of storage devices provides eventual consistency.

10. The computer-readable medium of claim 8, where the first version of the content is a current version of the content and the second version of the content is a previous version of the content,
where the first information includes the current version of the content;
where the second information includes the previous version of the content; and
where the one or more instructions further cause the processor to:
receive a second request to retrieve the content;
determine whether the second request is for the current version of the content or the previous version of the content;
when the second request is for the current version of the content, retrieve the current version of the content from at least one storage device of the first set of storage devices; and
when the second request is for the previous version of the content, retrieve the previous version of the content from at least one storage device of the second set of storage devices.

11. The computer-readable medium of claim 8, where the first version of the content is a current version of the content,
where the first information includes information that identifies the current version of the content; and
where the one or more instructions further cause the processor to:
receive, from a client device, a second request to retrieve the content,
the second request including a content identifier;
retrieve, from at least one storage device of the first set of storage devices, the information that identifies the current version of the content;
retrieve third information from at least one storage device of the second set of storage devices, based on the content identifier;
determine, based on the information that identifies the current version of the content, whether the third information is the current version of the content;
when the third information is the current version of the content, provide the third information to the client device; and
when the third information is not the current version of the content, retrieve fourth information, based on the content identifier.

12. The computer-readable medium of claim 11, where the one or more instructions, that cause the processor to retrieve the fourth information, further cause the processor to at least one of:
retrieve the fourth information from the at least one storage device of the second set of storage devices after a particular amount of time has passed since retrieving the third information; or
retrieve the fourth information from one or more storage devices, of the second set of storage devices, other than the at least one storage device of the second set of storage devices from which the third information was retrieved.

13. The computer-readable medium of claim 8, where the one or more instructions further cause the processor to:
receive a model that includes a parameter that describes a behavior of the second set of storage devices,
the second set of storage devices providing eventual consistency;
receive information that identifies a parameter value for the parameter;
execute the model, based on the parameter value, to simulate storage of simulated content to, and retrieval of the simulated content from, the second set of storage devices;
generate a result, based on executing the model, that identifies information associated with consistency faults; and
provide the result.

14. The computer-readable medium of claim 8, where the first version of the content and the second version of the content are a same version of the content,
where the first information includes a content version identifier for the same version of the content, and
where the second information includes the same version of the content.

15. A method, comprising:
receiving a model that includes a parameter that describes a behavior of a set of storage devices that provide eventual consistency,
the receiving the model being performed by a device;
receiving information that identifies a parameter value for the parameter,
the receiving information that identifies the parameter value being performed by the device;
executing the model, based on the parameter value, to simulate storage of content to, and retrieval of content from, the set of storage devices,
the executing the model being performed by the device;
generating a result, based on executing the model, that identifies information associated with consistency faults,
the consistency faults including instances where a response to a request for current content includes stale content,
the generating the result being performed by the device;
providing the result,
the providing the result being performed by the device; and
generating a storage rule based on the result,
the storage rule specifying a manner in which first information, associated with a first version of a content, is to be stored in a first storage device of the set of storage devices and in which second information, different than the first information and including a second version of the content, is to be stored in a second storage device of the set of storage devices based on a same request to store the content.

16. The method of claim 15, where the parameter describes at least one of:
a manner in which information is propagated through the set of storage devices;
a duration for propagation of content to all storage devices in the set of storage devices;
a quantity of storage devices in the set of storage devices;

a percentage of instances in which the stale content is retrieved from the set of storage devices;

a probability that stale content is retrieved from the set of storage devices;

a latency associated with the set of storage devices;

a bandwidth associated with the set of storage devices; or a quantity of requests for current content within a particular time period.

17. The method of claim 15, where the parameter value specifies at least one of:

an actual value for the parameter;

a default value for the parameter;

a minimum value for the parameter;

a maximum value for the parameter;

an average value for the parameter;

a random value for the parameter;

one or more threshold values for the parameter; or a function used to determine a value for the parameter.

18. The method of claim 15, where the result identifies at least one of:

a quantity of consistency faults that occurred during execution of the model;

a percentage of requests that resulted in a consistency fault during execution of the model; or one or more parameter values associated with the consistency fault.

19. The method of claim 15, further comprising:

establishing access to the first storage device and the second storage device;

receiving a request to store a particular content; and transmitting first information, associated with a first version of the particular content, to the first storage device and second information, including a second version of the particular content, to the second storage device, based on the storage rule and the request to store the particular content.

20. The method of claim 15, further comprising:

generating a retrieval rule based on the result, the retrieval rule specifying a manner in which content is to be retrieved from a plurality of physical storage devices that provide eventual consistency;

establishing access to the plurality of physical storage devices;

receiving a request to retrieve a particular content; and retrieving information, associated with the particular content, from a physical storage device of the plurality of physical storage devices, based on the retrieval rule.

\* \* \* \* \*